(12) United States Patent
Beer et al.

(10) Patent No.: US 9,108,159 B2
(45) Date of Patent: Aug. 18, 2015

(54) APPARATUS FOR PRODUCING SURFACE ENHANCED MEMBRANE

(75) Inventors: Hans Beer, Boesinghausen (DE); Klaus Froese, Hardegsen (DE); Lothar Knoechelmann, Einbeck (DE); Duane B. Piechocki, Pleasantville, NY (US)

(73) Assignee: Sartorius Stedim Biotech GmbH, Goettingen (DE)

( * ) Notice: Subject to any disclaimer, the term of this patent is extended or adjusted under 35 U.S.C. 154(b) by 850 days.

(21) Appl. No.: 12/875,965

(22) Filed: Sep. 3, 2010

(65) Prior Publication Data

US 2010/0330691 A1     Dec. 30, 2010

Related U.S. Application Data

(62) Division of application No. 10/051,459, filed on Jan. 22, 2002, now Pat. No. 7,807,475.

(51) Int. Cl.
*B01D 21/00* (2006.01)
*B01D 67/00* (2006.01)
*B01D 69/02* (2006.01)
*B01D 71/16* (2006.01)
*B01D 71/20* (2006.01)

(52) U.S. Cl.
CPC ........ *B01D 67/0086* (2013.01); *B01D 67/0009* (2013.01); *B01D 67/0016* (2013.01); *B01D 69/02* (2013.01); *B01D 71/16* (2013.01); *B01D 71/20* (2013.01); *B01D 2323/12* (2013.01); *Y10T 436/255* (2015.01); *Y10T 436/25125* (2015.01)

(58) Field of Classification Search
CPC ..................... B01D 67/0081; B01D 67/0086
USPC ................... 422/509, 510, 527; 436/175, 178
See application file for complete search history.

(56) References Cited

U.S. PATENT DOCUMENTS

| | | | | |
|---|---|---|---|---|
| 3,969,548 A | * | 7/1976 | Hunter et al. | 427/244 |
| 4,894,157 A | * | 1/1990 | Johnson | 210/490 |
| 5,628,960 A | | 5/1997 | Beer et al. | |
| 5,826,129 A | | 10/1998 | Hasebe et al. | |

FOREIGN PATENT DOCUMENTS

| | | |
|---|---|---|
| DE | 3708946 | 10/1988 |
| DE | 4438381 | 5/1996 |

* cited by examiner

*Primary Examiner* — Jill Warden
*Assistant Examiner* — Dwayne K Handy
(74) *Attorney, Agent, or Firm* — Crowell & Moring LLP

(57) ABSTRACT

A membrane having a refined surface as well as to a process and an apparatus for producing such a membrane, and which is useful, in particular, for rapid diagnostic tests for identifying specific analytes in liquid media.

12 Claims, 3 Drawing Sheets

APPARATUS FOR PRODUCING SURFACE ENHANCED MEMBRANE

CROSS REFERENCE TO RELATED APPLICATIONS

This application is a division of U.S. patent application Ser. No. 10/051,459, filed Jan. 22, 2002, now U.S. Pat. No. 7,807,475. Priority is claimed based on Federal Republic of Germany patent application no. DE 101 02 744.3, filed Jan. 22, 2001.

BACKGROUND OF THE INVENTION

The present invention relates both to a membrane composed of cellulose which has an improved surface, and to a process and an apparatus serving the manufacture of such membrane, the latter having application in particular to rapid diagnostic tests that are used to identify specific analytes present in fluid media.

Membranes composed of cellulose are frequently employed in the manufacture of dry reagents, and, more particularly, of test strips that are used in analysis and in medical diagnostics (diagnostic membranes). U.S. Pat. No. 5,628,960 discloses both such a symmetrical membrane comprising a polymer blend of cellulose nitrate and cellulose acetate which, containing micropores, is supported on a polyester carrier film, and a method for the production thereof. In the prior art rapid diagnostic tests employed to identify specific analytes, for example in human, animal and vegetable organisms, in food and in the environment, the requirement to bind proteins or protein-like substances used as analytes and the requirement to have large pore sizes, necessitates the use of membranes containing primarily cellulose nitrate as the dry reaction phase, since only this type of membrane can satisfy both of the aforementioned requirements. Such membranes are chiefly produced from critical casting solutions in a so-called evaporation process in which the underlying formation mechanism is based on a phase inversion.

This process permits the manufacture of microfiltration membranes comprising primarily cellulose nitrate and having pore widths ranging between approx. 0.01 and at least 12 µm. One disadvantage attending this process is that, beyond a pore width of approx. 0.45 µm, and, more particularly with respect to the membranes which being normally used in diagnostic applications, exhibit pore widths >0.45 µm, a distinct tendency to form so-called filter dust has been observed, resulting from the unwanted fractionated precipitation of the polymers during the phase inversion process.

The filter dust fraction is formed from the non-membrane-forming, low molecular portion of the commercially available feedstocks used which precipitate out chiefly in the form of a more or less loosely packed layer of dust or irregularly formed deposits on the surface of the membrane and, more noticeably, on the upper side of the heretofore prepared integrated membrane layer.

Most of the cellulose nitrate membranes that are employed for diagnostic purposes are in a film-supported format. Currently, such membranes are, for economic reasons, no longer produced by laminating the cellulose nitrate membrane onto an adhesive-coated film, but are rather produced by pouring membrane casting solutions directly onto a film as disclosed in Beer et al., U.S. Pat. No. 5,628,960.

It will, of course, be appreciated that the appearance of filter dust in such an arrangement is particularly problematic, since during the manufacture of such membranes, the casting solution can be applied only to the critical upper side of the membrane upon which filter dust has accumulated. Such deposits for a variety of reasons pose a major problem with respect to application in quick diagnostic tests. Due to differences in structure existing between the membrane layer and the filter dust deposit, the test liquids that are poured onto the membrane will migrate at different velocities on top or bottom, the result whereof being the formation of two separate traveling fronts over a broad, diffuse zone. The filter dust deposit moreover distorts the shape of the test lines and weakens the intensity of the resulting colour signals. These problems raise doubt as to the crucial precision and information value of the tests with respect to image sharpness, sensitivity, reproducibility and clarity.

A prior art process for eliminating the aforementioned problem consists of reprecipitating commercially available feedstocks in order to remove the low molecular components prior to using such feedstocks in the manufacture of the membrane. See Perl, German Patent No. DE 37 08 946 C1 and Beer et al., U.S. Pat. No. 5,628,960 (=DE 44 38 381). The disadvantages attending this multi-phase process are its complexity, its cost and its inefficiency.

SUMMARY OF THE INVENTION

It is therefore an object of the present invention to provide an improved process for refining the surface of membranes composed of cellulose.

Another object of the invention is to provide a process for refining the surface of a cellulose membrane which to effectively produce membranes which have surfaces that do not exhibit harmful impurities such as, for example, filter dust.

A further object of the invention is to provide a process for producing cellulosic membranes which can be employed as diagnostic membranes.

It is also an object of the invention to provide an improved apparatus for producing a cellulosic membrane with a refined or enhanced surface.

These and other objects are achieved in accordance with the present invention by providing a process for producing a cellulose membrane having a refined surface, comprising the steps of preparing a feedstock membrane from a cellulose membrane casting solution by phase inversion in an evaporation process, and prior to drying the resulting feedstock membrane, removing impurities from at least one side of said feedstock membrane from which the solvent is evaporated in the evaporation process of the feedstock preparation step.

In accordance with a further aspect of the invention, the objects are achieved by providing a surface-refined membrane composed of cellulose, produced by a process comprising the steps of preparing a feedstock membrane from a membrane casting solution by phase inversion in an evaporation process, and prior to drying the resulting feedstock membrane, removing impurities from at least one side of the feedstock membrane from which solvent has been evaporated in the evaporation process of the membrane preparation step.

In yet other aspects, the objects of the invention are achieved by providing an apparatus for refining a surface of a membrane composed of cellulose produced by phase inversion in an evaporation process, the apparatus comprising at least one membrane drawing machine for producing a feedstock membrane by phase inversion in an evaporation process; at least one membrane cleansing device for bringing at least one side of the feedstock membrane from which impurities are to be removed, into contact with at least one cleansing agent or cleansing device, and at least one membrane dryer; in which the membrane cleansing device is arranged between the membrane drawing machine and the membrane dryer.

The invention also includes a method of using strips of membrane according to the invention in diagnostic testing of analytes.

A first embodiment of the present invention relates in particular to a process which, serving the manufacture of a surface-refined membrane composed of cellulose, comprises the following steps:
(a) preparation of a feedstock membrane (crude membrane) from a membrane casting solution using phase inversion in an evaporation process, and
(b) prior to drying the resulting membrane, removal of impurities from at least that side of the feedstock membrane from which the solvent has been evaporated in the evaporation step mentioned in (a).

Preparation of the feedstock membrane composed of, for example, cellulose nitrate and/or cellulose acetate described in step (a) of the aforementioned is effected by means of a prior art evaporation process.

It is proposed that the impurities or deposits such as filter dust referred to in (b) be removed from that side of the feedstock membrane which, during the evaporation procedure mentioned in step (a) in which solvent components were evaporated, was exposed to the atmosphere. In the case of membranes which, in step (a) are prepared with a film-supported underside, this is preferably the upper side of the membrane.

It is preferred that step (b) of the proposed process comprises bringing that side of the membrane, from which impurities are to be removed, into contact with one or more cleansing agents and/or one or more cleansing devices. Impurities such as, for example, filter dust, are removed by means of, for example, the upper side of the membrane coming into contact with the cleansing agents/devices, without damage being caused to the membrane. At the same time, the upper sides of the membrane are homogenized.

In order to enhance the effectiveness of the proposed process, one preferred embodiment of the aforementioned process comprises that the impurities be removed after the membrane has been cast, but before all of the solvent or solvent mixture used to prepare the membrane, have been evaporated, since this arrangement affords improved access to the fine structure of the membrane for cleansing purposes. It is particularly advantageous if impurity removal be carried out at a juncture, at which the membrane still exhibits between 5 and 20 percent by weight and, more particularly, 10 to 15 percent by weight, of the original quantity of the solvent or solvent mixture (volatile components of the membrane casting solutions employed).

It is proposed that, for example, cleansing fluids, such as liquids or gases, be considered for use as cleansing agents. Liquid cleansing agents can, e.g. be applied in the form of washing fluids, by means whereof the impurities can be removed in a washing step lasting a predetermined amount of time, e.g. wherein the feedstock membrane passes at a preset speed through a bath filled with washing liquid. Another embodiment, which permits removal of impurities from the feedstock membrane, comprises that the cleansing liquid be applied, for example, to the upper side of the membrane in a pressurized stream of liquid. In this configuration, it will, of course be appreciated that the stream pressure can be regulated so as to permit the effective removal of impurities without exerting high mechanical loads upon the membrane when the latter is being sprayed with liquid.

Analogously, the impurities can be removed with the aid of a stream of pressurized gas, whereby filter dust, for example, is blown away. The gas preferred for this embodiment is air.

It is proposed that preferred cleansing agents contain water and/or an alcohol, which features preferably from 1 to 6 carbon atoms. Examples of suitable alcohols include methanol, ethanol, propanol, and, more particularly, isopropanol, butanol, pentanol and hexanol. Especially preferred cleansing agents are water and mixtures of water and the aforementioned alcohols, and, more particularly, such mixtures, in which the ratio of the volume of water to alcohol is 1:1 to 20:1. 5:1 to 15:1 is particularly preferred, with 10:1 being most preferred.

A further advantageous configuration of the proposed process comprises that the membrane be brought into contact with one or more wipers and/or one or more suction devices serving as (mechanical) cleansing devices.

One advantage attending the proposed process is its flexible configuration, which allows its adaptation to the individual requirements of a given membrane, insofar as single, or a plurality of the aforementioned cleansing agents or apparatuses or any combination thereof, can be employed during the removal of the impurities.

Thus, having application to this object are mechanical wipers having, for example, wipers or brushes, washing apparatuses having washing liquids, in which the membranes are dipped and moved, suction apparatuses whereby air or a rinsing liquid is streamed over the upper sides of the membrane and, together with the filter dust suctioned off, blowing apparatuses serving to produce a stream of gas or devices producing a stream of liquid in order to remove filter dust from the upper sides of the membrane, spraying devices serving to spray washing liquids onto the upper sides of the membrane, and other similar devices as well as combinations thereof.

In one preferred embodiment of the invention, the membranes pass at step (b)
(i) through a first and a second washing device so as to be brought into contact with one or more cleansing agents, and
(ii) through one or more wipers.

This embodiment is advantageously configured so as to permit the membrane, immediately upon exiting the membrane drawing machine, to pass through a first washing device, and wipers, which can be integrated with the first washing device, and then through a second washing device.

Membranes composed of cellulose which are used, for example, in medical diagnostics, are, as a rule, treated with additives or reagents in order to impart to such membranes certain characteristics required for their use as diagnostic tools. Since the addition of additives to the membrane casting solution can adversely influence membrane formation, a further preferred embodiment of the invention comprises impregnating the membrane with at least one additive.

The membrane is preferably brought into contact with at least one additive or reagent while the membrane is passing through at least one, and preferably the final washing device, wherein an additive or reagent is added to the washing agent. This arrangement is particularly advantageous, since it has been found that the additive is at least partially removed from both the inner and outer surfaces of the membrane by means of the rinsing agent that is contained in the first washing device.

In this arrangement, membrane thickness, the type and concentration of the additives as well as the period of time spent by the membranes in the last washing device, i.e in the impregnation baths, are adjusted relative to one another in order to permit a homogenous distribution of the additives throughout the membrane layer and at sufficient operational speed for later employment, e.g. as a diagnostic membrane.

It is understood that the inner surface refers to the surface inside the membrane pores. Additives refers, for example, to substances serving to alter both the contact angle and the adsorptive characteristics of the membrane surface, such as, e.g. wetting agents, other hydrophilic, or, rather, hydrophobic agents, such as hygroscopic-regulating or pH value regulating agents (buffer substances). The contact angle or wetting angle is that angle formed between a drop of liquid (mostly water) and the outer surface of a flat membrane.

The aforementioned process permits, more particularly, the preparation of membranes having improved surface characteristics and a pore width from 0.01 to 12 μm. Especially preferred membranes exhibit a pore width of greater than 0.45 μm. Prior art systems have been unable to efficiently produce impurity-free membranes possessing pores of this width.

A further embodiment of the present invention permits, with the aid of the aforementioned process, manufacture of a membrane composed of cellulose having a refined surface. The resulting membrane is suitable, for example, for use in diagnostics, and, more particularly, in diagnostic test strips.

A further object of the present invention relates to an apparatus serving to enhance or refine the surface of a membrane composed of cellulose which has been produced by means of phase inversion as part of an evaporation process, comprising at least one membrane drawing machine that is designed to produce a feedstock membrane by means of phase inversion in an evaporation process, at least one membrane washing device, which, for the purpose of bringing at least that side of the feedstock membrane from which impurities are to be removed into contact with one or more cleansing agents and/or one or more cleansing devices, and at least one membrane dryer,
wherein the membrane cleansing device is arranged between the membrane drawing machine and the membrane dryer.

A preferred proposed apparatus for carrying out the process for refining or enhancing the surface of membranes composed of cellulose, such membranes being produced from membrane casting solutions in an evaporation process by means of phase inversion, comprises a membrane cleansing device having one or more mechanical wipers and/or suction devices and one or more washing devices. As described above, the membrane cleansing device is arranged between a membrane drawing machine serving the implementation of the evaporation process, and a membrane (end) dryer. This configuration permits the upper sides of the membranes, which upper sides are exposed to the atmosphere when the solvent components are evaporated, to be guided past and/or through the mechanical wipers and washing devices, whereby impurities, for example, filter dust, are removed from the membranes when the upper sides of the membranes come into contact with the wipers and the wash liquids of the washing devices.

In one preferred embodiment, there are a first washing device, and at least one wiper, as well as a second washing device. The first washing device, which is preferably arranged directly downstream of the membrane drawing machine, comprises both at least one wash basin or reservoir containing washing liquid and guide rollers serving to advance the membranes and being arranged in such a manner that the membranes, when passing through the washing device, are transferred into and out of the washing device. The second washing device, which comprises at least one wash basin or reservoir containing washing liquid and guide rollers serving to transfer the membranes, is preferably arranged directly upstream of the membrane dryer. Suitable washing liquids which can be used include, for example, water and aqueous solutions or water/alcohol mixtures.

In a further preferred embodiment of the invention, in order to bring the membrane simultaneously into contact with an additive present in the washing liquids, which can for example, be water or a water/alcohol mixture that is present inside the wash basin that is arranged upstream of the membrane dryer, at least one additive, e.g. a wetting agent is added thereto.

The mechanical wipers, or, rather, the suction devices, extend preferably at least over the integral width of the membrane. One advantageous configuration of a suction device comprises a device which, being fitted with a suction slit and developing under pressure, is arranged above the upper side of the membrane.

In accordance with a further preferred embodiment, the wipers, which are provided with resilient wiper elements, are arranged so as to permit the wiper elements to sweep across the upper side of the membrane, whenever membrane and wipers are moved relative to the wiper elements, thus wiping away the impurities.

It is preferred that the wiper elements be disposed upon the outer peripheral surface of a rotating wiping roller that rotates preferably in the direction in which the membrane is drawn, in which case the rotation speed is greater than the speed at which the membrane is drawn. In order to prevent the membrane from sustaining mechanical damage, a support roller can be used in conjunction with the wiper roller in order to support the membrane. In such an arrangement, the membrane is guided through a nip between the wiper roller and the support roller. The latter rotates in the direction of draw at a speed corresponding to that of the draw. By drawing speed is meant the speed at which the membrane moves through the drawing machine.

In another embodiment of the apparatus of the invention, the membrane is guided directly over the rotating or immobile wiping device. Particularly suited to this role are wipers, with respect to which the resilient wiper elements comprise rubber wipers and/or brushes. In a further embodiment of the proposed device, the wipers are integrated with the first washing device. In the event the enhanced surface membranes to be processed are diagnostic membranes, which are applied to a carrier film, the proposed device can feature only one wiper, which is arranged preferably above the washing liquid of the first washing device. In another preferred embodiment, the wipers are fitted with nozzles, through which washing liquid is sprayed onto the wiper elements, for the purpose of removing any impurities that may be sticking to the wiper elements.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 3:
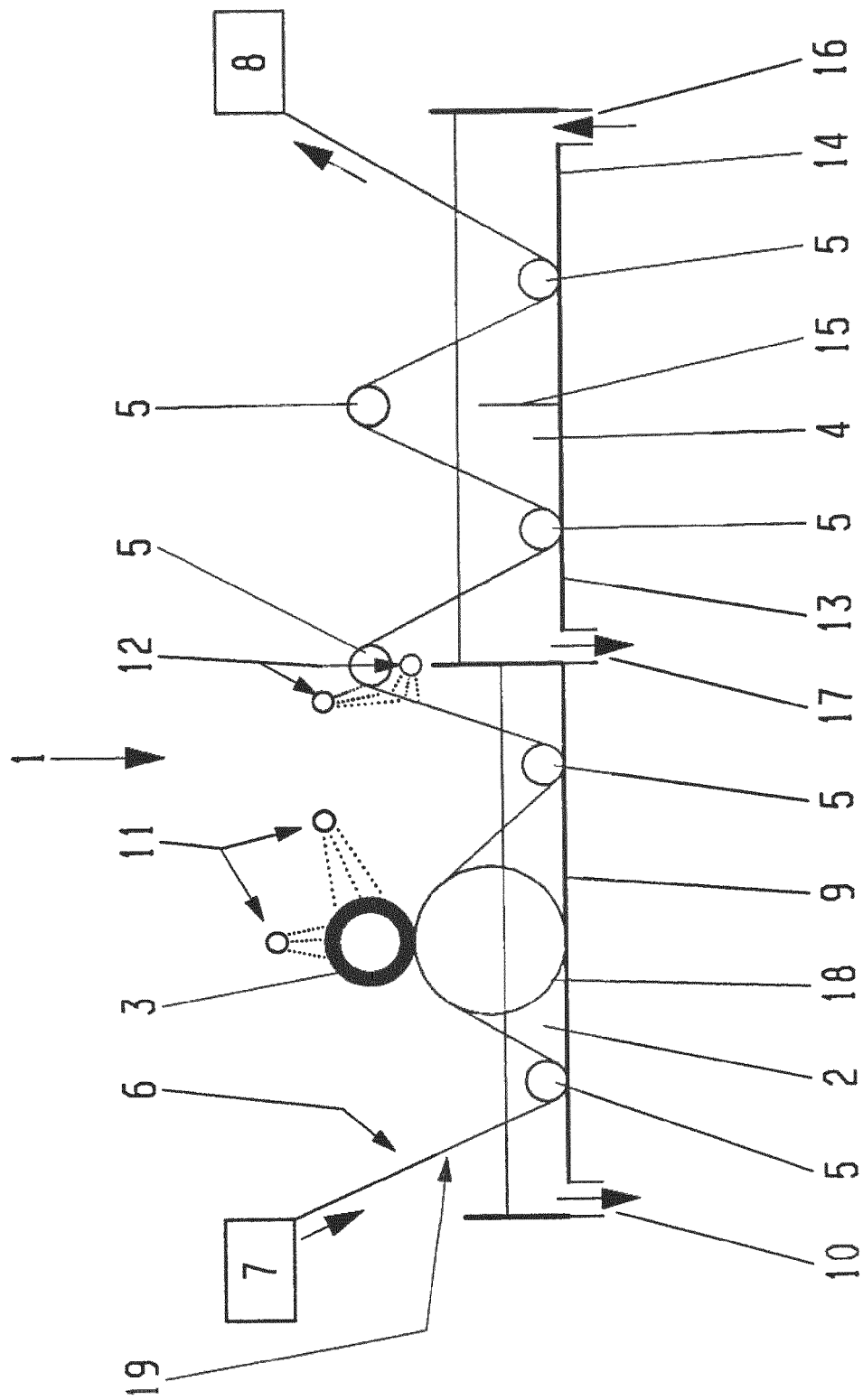
FIG. 3 shows a schematic representation of a specific embodiment of an apparatus according to the invention.

In FIG. 3, the proposed device comprises a membrane cleansing device (1) having a first rinsing device (2), a rotating brush serving as a mechanical wiper (3) as well as a second rinsing device (4). Rinsing devices (2) and (4) are fitted with guide rollers (5) serving to guide membrane (6). Membrane cleansing device (1) is arranged between a membrane drawing machine (7) serving the implementation of the evaporation process as well as a membrane dryer (8). First rinsing device (2) is arranged immediately downstream of membrane drawing machine (7) and comprises a wash basin (9) comprising an outlet for washing liquid (10). Spray nozzles (11,12) are provided for the purpose of spraying fresh washing liquid onto both wiper (3) and the membrane issuing from first rinsing device (2). Second rinsing device (4) comprises two wash basins (13,14) which, being separated by means of a partition wall (15), serve to prevent impurities from being carried into wash basin (14). The washing liquid, to which additives have been added, flows through an inlet (16) into wash basin (14) and drains out of wash basin (13) through outlet (17).

In order to protect membrane (6) against mechanical damage, a support roller (18), arranged in addition to wiper roller (3), supports the membrane on its film-supported side (19). In this arrangement, membrane (6) is guided between wiper roller (3) and support roller (18).

In order to realize the proposed process, the film-supported membrane (6) is transferred at drawing speed, immediately upon issuing from membrane drawing machine (7), over guide rollers (5) and support roller (18), through the washing liquid of first rinsing device (2). In this configuration, the upper side of membrane (6) is brushed by means of rotating wiping roller (3) configured as a brush, in the presence of washing liquid (11) (preferably water or a water/alcohol mixture) whereby most of the impurities e.g. filter dust, are loosened and removed. Prior to issuing from first rinsing device (2), the upper side of membrane (6), or, rather, the under side of film (19) is washed of any impurities that may remain thereupon, by means of washing liquid issuing from nozzles (12). Membrane (6) is, when passing through second rinsing device (4), into which a washing liquid, to which additives have preferably been added, enters via inlet (16), impregnated with such additives, and thereafter dried in dryer (8).

EXAMPLES

Manufacturing Example 1

Figure 1:
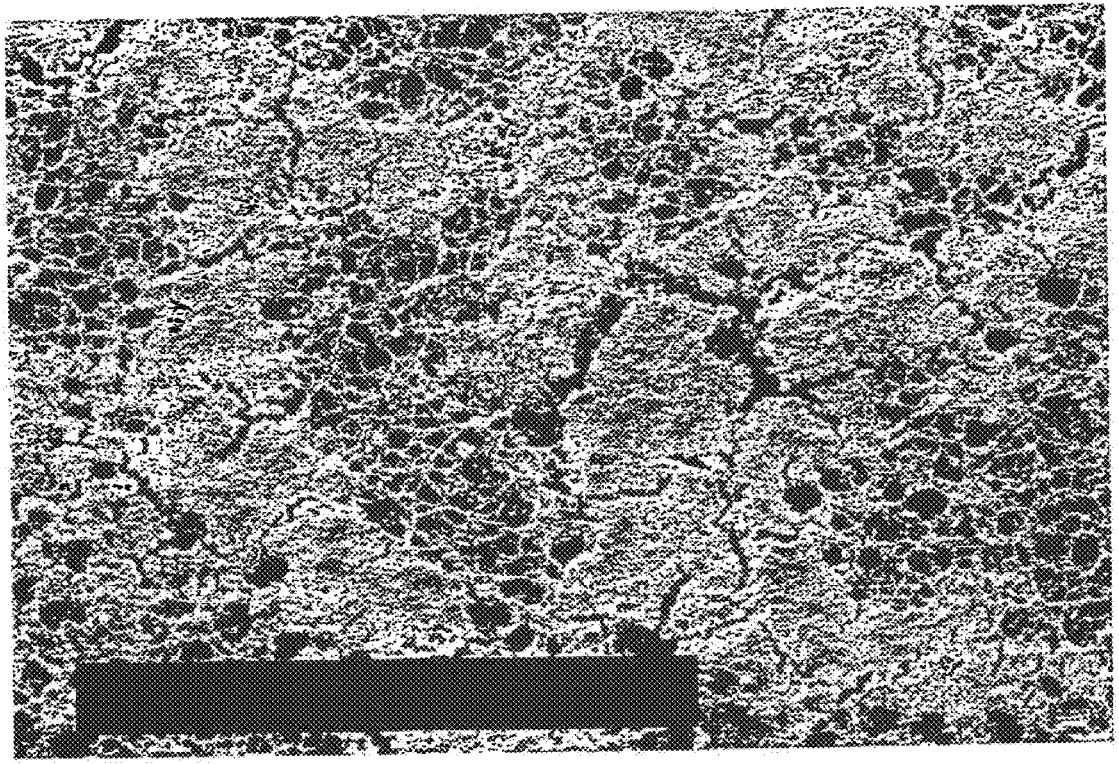
FIG. 1 shows a scanning electron microscopic (SEM) photograph (enlarged 400×) of the upper side of a film-supported membrane without surface enhancement which, having been produced by direct coating, exhibits a deposit of filter dust.

A prior art membrane casting solution comprising a polymer blend of commercially available cellulose nitrate and cellulose acetate is, in a membrane drawing machine, applied to a carrier film comprising polyethylene terephthalate having a layer thickness of 100 µm. The now-coated film is, during its transit through the drawing machine up to the exit thereof, subjected to evaporation for the purpose of removing the greater part of the components of the solvent mixture, whereby the carrier-supported membrane results from phase inversion. The membrane, having being dried in the end dryer (three-roller frame) exhibits both pores approx. 10 µm wide and filter dust deposits on its upper side (FIG. 1).

Operation Example 1

Figure 2:
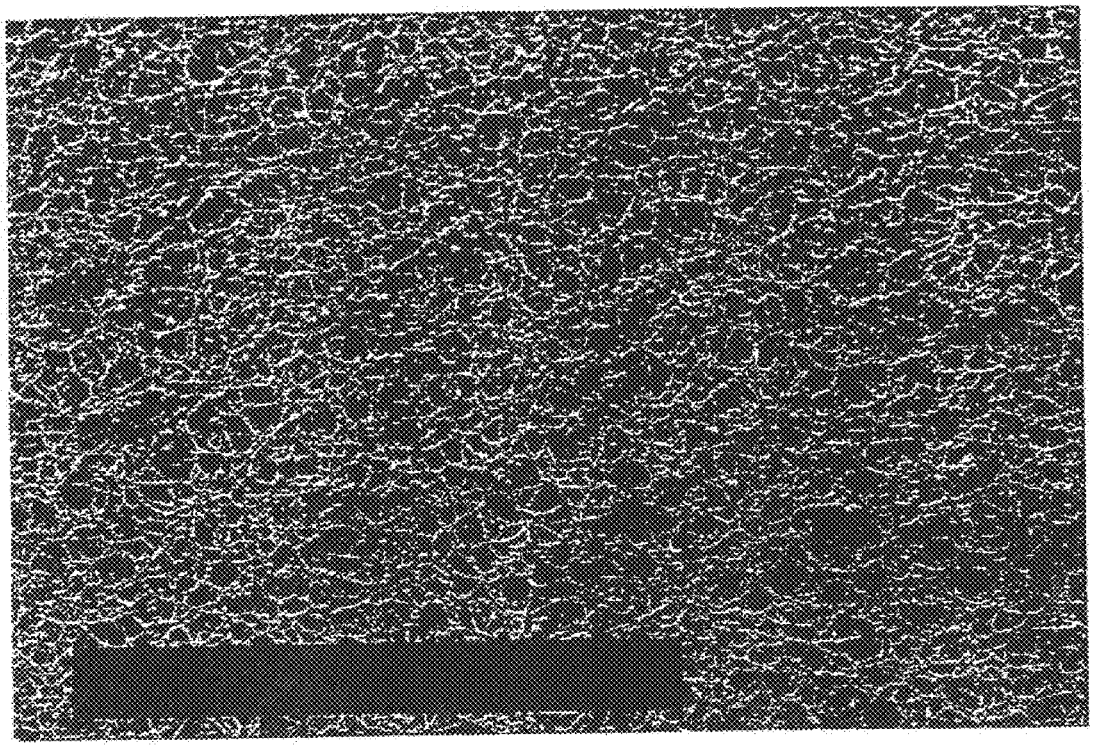
FIG. 2 shows a SEM photograph (enlarged 400×) of the upper side of a film-supported membrane according to the present invention.

The membrane resulting from aforementioned Manufacturing Example 1, is transferred, when still damp, from the exit of the membrane drawing machine into the proposed membrane cleansing device that is schematically represented in FIG. 3. Water is used as rinsing liquid. Employed as the mechanical wiper is a roller shaped brush, whose circumference speed corresponds to approx. 10 times the speed at which the membrane is drawn. The membrane is impregnated in the second rinsing device with a 0.01 to 1.5% solution of an anionic wetting agent. The membrane is next dried as described in Manufacturing Example 1. The resulting membrane, which has pores approx. 10 µm wide, is, however, free of filter dust and other impurities (FIG. 2) and exhibits, when tested with a test fluid, (a solution of phenol red) a migration time of on average 90 sec./40 mm with an unbroken, straight front of advance and produces, when applied, a precise, intensely-coloured test line. The migration speed was measured in the vertical suction direction in accordance with DIN 53106.

Comparison Example 1

By way of comparison, the membrane resulting from Manufacturing Example 1, which has been conventionally manufactured and undergone no further processing, both exhibits a surface covered with filter dust and produces, upon migration with test fluid (phenol red solution) a double advancement front with different migration times on both upper or lower sides of the membrane and, when applied, exhibits a diffuse, weakly delineated test line.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

The invention claimed is:

1. An apparatus for refining a surface of a membrane composed of cellulose produced by phase inversion in an evaporation process, said apparatus comprising:
    at least one membrane drawing machine for producing a feedstock membrane by phase inversion in an evaporation process;
    at least one membrane cleansing device comprising at least one wiper provided with a resilient wiper element or suction device for bringing at least one side of the feedstock membrane from which impurities such as filter dust are to be removed into contact with at least one cleansing agent or mechanical cleansing device, and
    at least one membrane dryer;
    wherein said membrane cleansing device is arranged between the membrane drawing machine and the membrane dryer at a position at which the feedstock membrane is in a partially-solidified state in which a fraction of solvent in the partially-solidified membrane is between 5-20% by weight of a fraction of solvent in a pre-casting feedstock solution, and
    wherein the membrane cleansing device comprises a wiper roller with wiper elements arranged on an outer surface thereof, said wiper roller rotating in the direction in which the membrane is drawn, and at a speed greater than the speed at which the membrane is drawn.

2. An apparatus according to claim 1, wherein the membrane cleansing device comprises at least one rinsing device for rinsing the side of the feedstock membrane from which impurities are to be removed, with a cleansing liquid comprising at least one cleansing agent.

3. An apparatus according to claim 2, wherein a first rinsing device is arranged immediately downstream of the membrane drawing machine and a second rinsing device is arranged immediately upstream of the membrane dryer.

4. An apparatus according to claim 3, wherein said first rinsing device comprises at least one nozzle for spraying a washing liquid on the side of the membrane from which impurities are to be removed.

5. An apparatus according to claim 3, wherein said first and second rinsing devices each comprise a washing basin for holding a cleansing liquid, and guide rollers for transporting the membrane through the respective washing basins.

6. An apparatus according to claim 5, wherein the washing basin of the second rinsing device contains a washing liquid, which, in turn, contains at least one additive.

7. An apparatus according to claim 6, wherein the additive is a wetting agent.

8. An apparatus according to claim 1, wherein each wiper comprises a wiper element having a width at least equal to the membrane and arranged on the resilient element so that when the membrane is moved relative to the wiper, the wiper element will sweep over the side of the membrane from which impurities are to be removed.

9. An apparatus according to claim 1, wherein membrane cleansing device further comprises a support roller which rotates in the direction in which the membrane is drawn and at the speed at which the membrane is drawn, said support roller being arranged to form a nip with the wiper roller through which the membrane is guided.

10. An apparatus according to claim 8, wherein each wiper element comprises a rubber wiper or a brush.

11. An apparatus according to claim 2, wherein said rinsing device comprises a wash basin containing a cleansing liquid and at least one wiping element arranged above the wash basin to wipe cleansing liquid from the membrane emerging from the wash basin.

12. An apparatus for refining a surface of a membrane composed of cellulose produced by phase inversion in an evaporation process, said apparatus comprising:

at least one membrane drawing machine for producing a feedstock membrane by phase inversion in an evaporation process;

at least one membrane cleansing device comprising at least one wiper provided with a resilient wiper element or suction device for bringing at least one side of the feedstock membrane from which impurities such as filter dust are to be removed into contact with at least one cleansing agent or mechanical cleansing device, and at least one membrane dryer;

wherein said membrane cleansing device is arranged between the membrane drawing machine and the membrane dryer at a position at which the feedstock membrane is in a partially-solidified state in which a fraction of solvent in the partially-solidified membrane is between 5-20% by weight of a fraction of solvent in a pre-casting feedstock solution, wherein each wiper comprises a wiper element having a width at least equal to the membrane and arranged on the resilient element so that when the membrane is moved relative to the wiper, the wiper element will sweep over the side of the membrane from which impurities are to be removed, and wherein said wiper elements are provided with nozzles for spraying a rinsing liquid onto the wiper elements.

* * * * *